(No Model.)
W. P. FIREY.
DEVICE FOR PREVENTING BURSTING OF FREEZING PIPES.
No. 596,062. Patented Dec. 28, 1897.
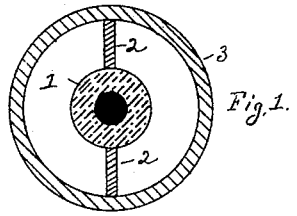
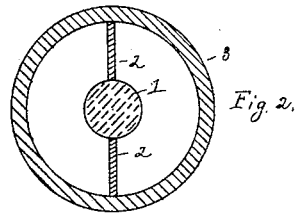
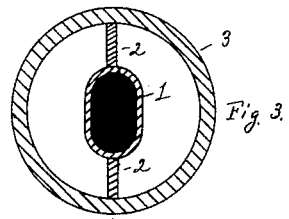
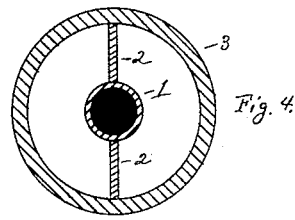
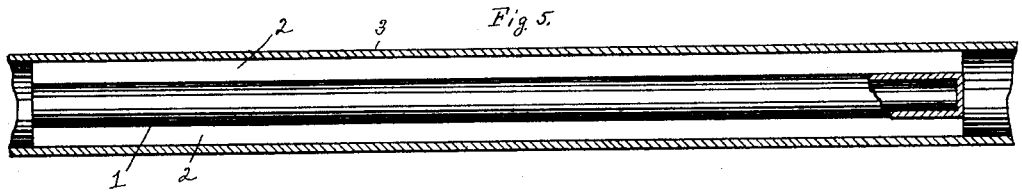
Witnesses
Inventor
W. P. Firey
By Glasco Chidler
Attorneys

UNITED STATES PATENT OFFICE.

WILLIAM PAYSON FIREY, OF ROANOKE, VIRGINIA.

DEVICE FOR PREVENTING BURSTING OF FREEZING PIPES.

SPECIFICATION forming part of Letters Patent No. 596,062, dated December 28, 1897.

Application filed May 12, 1896. Renewed May 20, 1897. Serial No. 637,463. (No model.)

*To all whom it may concern:*

Be it known that I, WILLIAM PAYSON FIREY, a citizen of the United States, residing at Roanoke, in the county of Roanoke and State of Virginia, have invented a certain new, useful, and valuable Improvement in Devices to Prevent Bursting of Freezing Pipes, of which the following is a full, clear, and exact description.

My invention has relation to a device to prevent the bursting of water-pipes in freezing; and it consists in the novel construction and arrangement of its parts, as hereinafter described.

In the accompanying drawings, Figure 1 is a transverse sectional view of a pipe, showing a hollow rubber core located in the center of the pipe. Fig. 2 is a transverse sectional view of a pipe, showing a solid rubber core placed in the pipe. Fig. 3 is a transverse sectional view of a pipe, showing an elliptical metallic hollow core placed in the pipe. Fig. 4 is a transverse sectional view of a pipe, showing a hollow cylindrical metallic core inserted in the pipe. Fig. 5 is a longitudinal sectional view of a pipe, showing the antibursting device located therein.

The device consists of the core 1. Said core may be made of rubber or any other suitable material. The core may be hollow, as shown in Figs. 1, 3, and 4, or it may be solid, as shown in Fig. 2. The core may be located in the center of the pipe and held in place therein by the flanges 2 2. When the hollow core is used, both ends of the core are closed. The flanges 2 2 are secured to the core by any suitable means. The liquid passes through the pipe 3 and practically surrounds the core 1.

The core shown in Fig. 3 possesses more elasticity and is better adapted to the purpose than the cylindrical core shown in Fig. 4, for the reason that there is more give in the flattened sides of the core than would be found if the said sides were cylindrical.

Having described my invention, what I claim as new, and desire to secure by Letters Patent, is—

1. In a pipe a yielding core located therein, flanges secured to said core and adapted to retain the same in the center of the pipe.

2. In a pipe, a yielding core located therein, said core consisting of a hollow elliptical tube.

3. In a pipe, a yielding core located therein, said core consisting of a hollow elliptical tube, flanges secured to the tube and retaining the tube in the center of the pipe.

4. In a pipe, a yielding core located therein, said core being elliptical in shape about its periphery.

In testimony whereof I affix my signature in presence of two witnesses.

WILLIAM PAYSON FIREY.

Witnesses:
 W. J. BLAIR,
 M. F. CARUN.